(12) United States Patent
Ishikawa et al.

(10) Patent No.: US 6,659,908 B2
(45) Date of Patent: Dec. 9, 2003

(54) DOUBLE-CAVITY TOROIDAL-TYPE CONTINUOUSLY VARIABLE TRANSMISSION AND METHOD FOR ASSEMBLING SAME

(75) Inventors: Kouji Ishikawa, Kanagawa (JP); Nobuo Goto, Kanagawa (JP); Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/115,127

(22) Filed: Apr. 4, 2002

(65) Prior Publication Data

US 2002/0147069 A1 Oct. 10, 2002

(30) Foreign Application Priority Data

Apr. 6, 2001  (JP) ..................... P. 2001-108632

(51) Int. Cl.[7] .............................................. F16H 15/38
(52) U.S. Cl. ........................................................ 476/42
(58) Field of Search .............................. 476/40, 42, 46

(56) References Cited

U.S. PATENT DOCUMENTS 4,893,517 A     1/1990  Nakano
6,244,985 B1 *  6/2001  Wafzig et al. ................. 476/42
6,375,595 B1 *  4/2002  Machida et al. ............... 476/42
6,547,690 B1 *  4/2003  Kuhn et al. .................... 476/42
2002/0049113 A1 * 4/2002 Watanabe et al. ............. 476/8

FOREIGN PATENT DOCUMENTS

JP      6-174031      6/1994
JP      7-96901       10/1995
JP      2638896       4/1997
JP      11-108139     4/1999
JP      2000-35099    2/2000
JP      3055383       4/2000

* cited by examiner

*Primary Examiner*—David Fenstermacher
(74) *Attorney, Agent, or Firm*—Sughrue Mion, PLLC (57) ABSTRACT

A double-cavity toroidal-type continuously variable transmission includes a case, a drive shaft and a toroidal transmission mechanism portion. The toroidal transmission mechanism portion includes a gear housing for supporting an output gear, and a yoke for supporting a pivot shaft of a trunnion in an oscillatable manner. The support post for supporting the yoke and a fixing member for fixing the gear housing and the support post to the case are connected together or are formed as an integral body.

8 Claims, 7 Drawing Sheets

PRIOR ART

FIG.6

PRIOR ART

DOUBLE-CAVITY TOROIDAL-TYPE CONTINUOUSLY VARIABLE TRANSMISSION AND METHOD FOR ASSEMBLING SAME

BACKGROUND OF THE INVENTION

1. Field of the Invention

The present invention relates to a double-cavity toroidal-type continuously variable transmission for use as a transmission for an automobile, and a method for assembling the same.

2. Description of the Related Art

Figure 5:
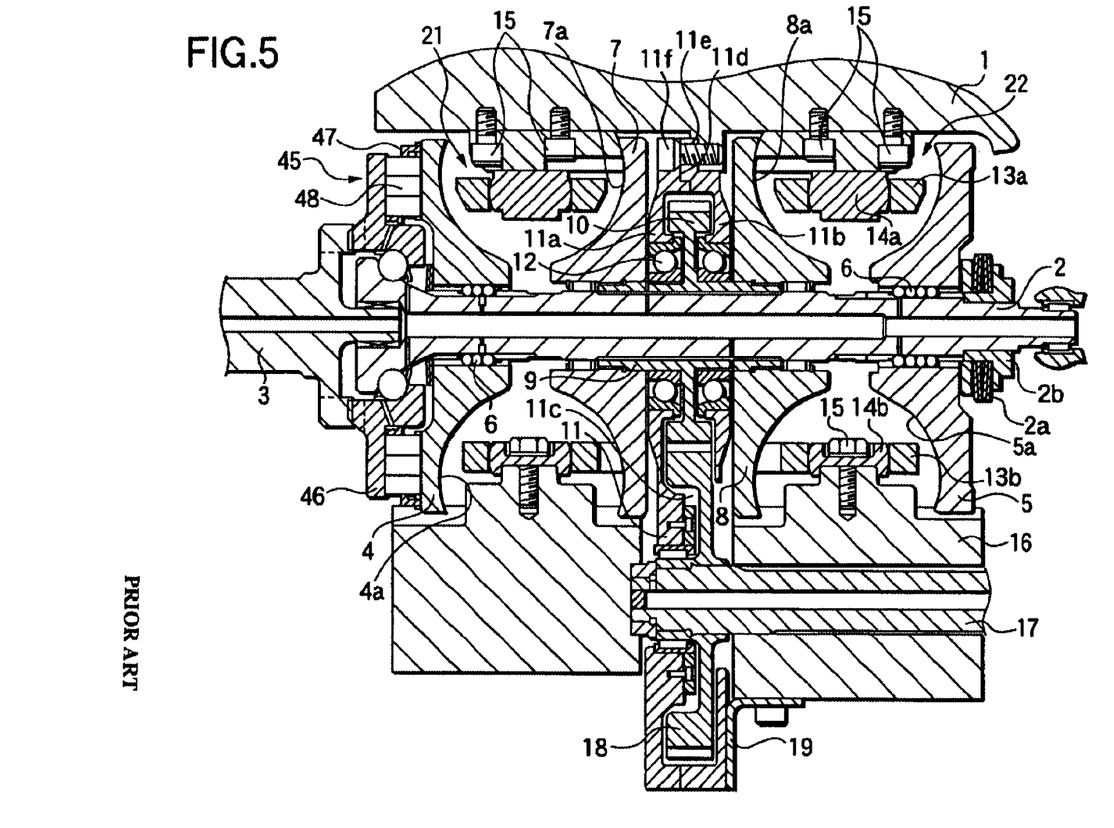
FIG. 5 is a longitudinal side view of a double-cavity toroidal-type continuously variable transmission in the related art; and, FIG. 6 is a longitudinal plan view of the double-cavity toroidal-type continuously variable transmission in the related art.
Figure 6:
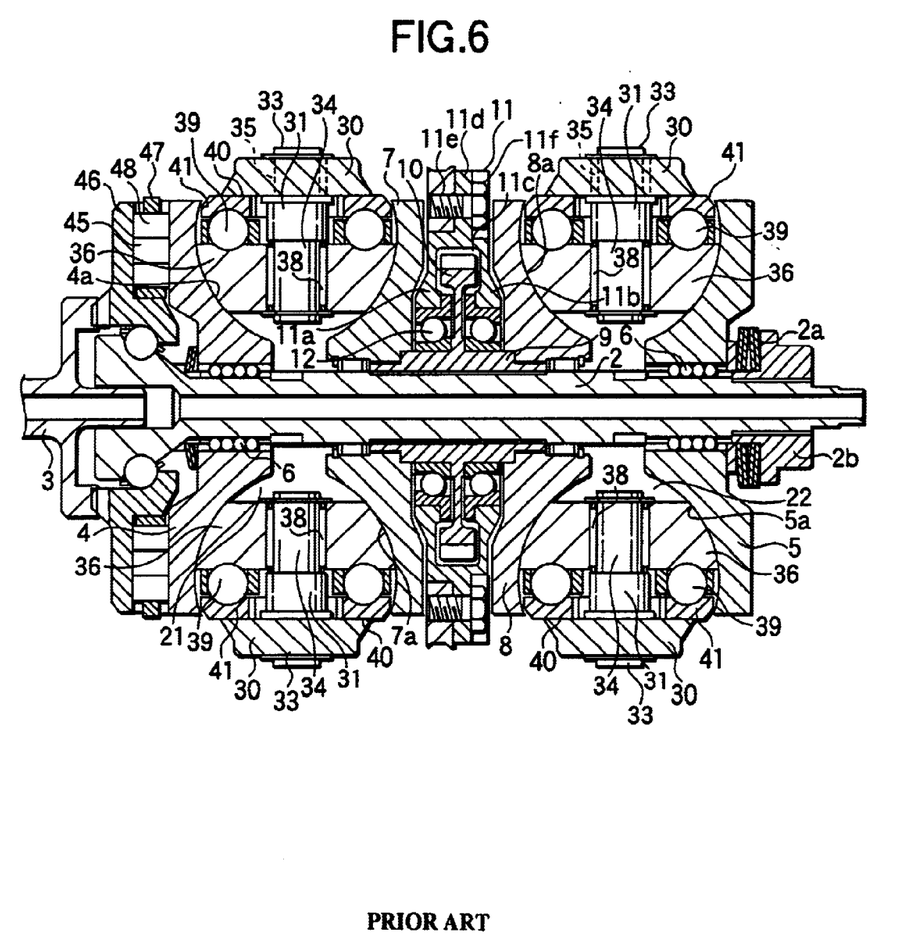

An example of a double-cavity toroidal-type continuously variable transmission for use as a transmission for an automobile is disclosed in JP-A-2000-35099. The double-cavity toroidal-type continuously variable transmission is structured as shown in FIGS. 5 and 6. That is, an input shaft 2 is rotatably supported in the interior of a case 1. A rotation force can be input to the input shaft 2 from a drive shaft 3 through a pressing mechanism which is constructed by a loading cam (which will be discussed later).

First and second input disks 4, 5 are supported to the near-to-two-end-portions of the input shaft 2 through their respective ball splines 6 in such a manner that their respective inner surfaces 4a, 5a are opposed to each other. Therefore, the first and second input disks 4, 5 are supported on the inside of the case 1 in such a manner that they are concentric with each other and can be rotated synchronously with each other. Also, the back surface of the second input disk 5 is supported by a loading nut 2b through a coned disk spring 2a and applies a pre-load to the two input disks 4, 5 by the coned disk spring 2a.

First and second output disks 7, 8 are supported on the periphery of the middle portion of the input shaft 2 through a sleeve 9. The sleeve 9 includes an output gear 10 integrally disposed on the outer peripheral surface of the middle portion thereof, and has an inside diameter larger than the outside diameter of the input shaft 2. The sleeve 9 is supported on a gear housing 11 disposed within the case 1 by a pair of ball bearings 12 in such a manner that the sleeve 9 is concentric with the input shaft 2 and can be rotated with the input shaft 2.

The gear housing 11 includes a pair of left and right support walls 11a, 11b and forms a ring-shaped space portion 11c interposed between the pair of left and right support walls 11a, 11b for enveloping the teeth portion of the output gear 10, while the outer peripheral edge portion of the gear housing 11 is engaged by a stepped engaging portion lid. Further, a plurality of bolt holes 11e are formed in the stepped engaging portion 11d, in the transverse direction thereof (the same direction as the axial direction of the input shaft 2) and, bolts 11f are inserted into these bolt holes 11e respectively; and, the housing 11 is fixed to the inner surface of the case 1 by these bolts 11f.

The output gear 10 is meshingly engaged with a transmission gear 18 which is fitted with an output shaft 17, while this transmission gear 18 is also enveloped by the gear housing 11. Also, the gear housing 11 is fixed to a valve body 16 by a fixing member 19.

The first and second output disks 7, 8 are spline engaged with the two end portions of the sleeve 9 in such a manner that their respective inner surfaces 7a, 8a are directed to the mutually opposite directions. Therefore, the first input disk 4 and first output disk 7 are rotatably supported with their respective inner faces 4a, 7a opposed to each other, while the second input disk 5 and second output disk 8 are rotatably supported with their respective inner faces 5a, 8a opposed to each other.

At the positions of the inner surface of the case 1, which are present on the lateral sides of the first and second output disks 7, 8, there are respectively supported an upper yoke 13a and a lower yoke 13b in such a manner that they hold the two disks 7, 8 from both sides. The upper yoke 13a and lower yoke 13b are respectively supported on support posts 14a, 14b in such a manner that they can be shifted slightly, while the support post 14a is fixed to the inner surface of the case 1 by a plurality of bolts 15. The support post 14b is fixed to the valve body 16 by the bolts 15. That is, the support posts 14a, 14b are fixed in the vertical direction (a direction at right angles to the axial direction of the input shaft 2) by the bolts 15.

These support posts 14a, 14b are respectively disposed in a first cavity 21, which is an intermediate portion between the inner surface 4a of the first input disk 4 and the inner surface 7a of the first output disk 7, and in a second cavity 22 which is an intermediate portion between the inner surface 5a of the second input disk 5 and the inner surface 8a of the second output disk 8, in such a manner that the support posts 14a, 14b are respectively disposed opposed to the first and second cavities 21 and 22.

Therefore, in a state where the yokes 13a, 13b are supported on their respective support posts 14a, 14b, the one-end portions of the yokes 13a, 13b are opposed to the outer peripheral portion of the first cavity 21, while the other-end portions thereof are opposed to the outer peripheral portion of the second cavity 22.

Because the first and second cavities 21, 22 are the same in structure, description will be given below only of the first cavity 21. That is, a pair of trunnions 30 are disposed in the first cavity 21. The pair of trunnions 30 are set at positions along an imaginary plane that is perpendicular to an imaginary line connecting the respective axes of the input and output disks, and distanced from the intersection of the imaginary plane and imaginary line. This physical relation is hereinafter referred to as "twisted position". The two end portions of each of the trunnions 30 are supported on the end portions of the upper yoke 13a and lower yoke 13b in such a manner that they can be swung and can be shifted in the axial direction thereof.

Displacement shafts 31 are supported in the middle portions of the trunnions 30, respectively. Each of the displacement shafts 31 includes a support shaft portion 33 and a pivot shaft portion 34 which are arranged parallel to and eccentric to each other. The support shaft portion 33 is supported on the trunnion 30 through a radial needle roller bearing 35. Also, a power roller 36 is supported on the periphery of the pivot shaft portion 34 through another radial needle roller bearing 38.

By the way, the displacement shafts 31, which are disposed by a pair in every first and second cavities 21, 22, are situated on the 180° opposite side to the input shaft 2 in every first and second cavities 21, 22. Also, the directions, in which the pivot shaft portions 34 of the displacement shafts 31 are eccentric to their respective support shaft portions 33, is set in the same direction with respect to the rotation direction of the first and second input disks 4, 5 and first and second output disks 7, 8. Also, the eccentric direction is a direction substantially at right angles to the installation direction of the input shaft 2. Therefore, the power roller 36 is supported in such a manner that it can be shifted slightly in the installation direction of the input shaft 2 and transmission shaft 3. As a result of this, even in case where the power roller 36 tends to shift in the axial direction of the input shaft 2 due to variations in the elastic deformation amount of the transmission components caused by variations in torque to be transmitted by the double-cavity toroidal-type continuously variable transmission, the shifting amount of the power roller 36 can be absorbed without applying an unreasonable force to the components.

Further, a thrust ball bearing 39 and a thrust bearing 40 such as a sliding bearing or a needle roller bearing are disposed between the outer peripheral surface of the power roller 36 and the inner peripheral surface of the middle portion of the trunnion 30 in this order from the outer surface of the power roller 36. The thrust ball bearing 39, while supporting a thrust-direction load applied to the power roller 36, allows the rotation of the power roller 36. Also, the thrust bearing 40, while supporting a thrust load applied to the outer race 41 of the thrust ball bearing 39 from the power roller 36, allows the pivot shaft portion 34 and outer race 41 to swing about the support shaft portion 33.

Also, a pressing mechanism 45 of a loading cam type is interposed between the input shaft 2 and first input disk 4. The pressing mechanism 45 is rotatably supported on the end portion of the input shaft 2 through an angular ball bearing, and includes a cam plate 46 rotatable together with the input shaft 2 and a plurality of rollers 48 rollably held by a retainer 47. And, based on the rotation of the input shaft 2, the pressing mechanism 45 can rotate the first input disk 4 while pressing it toward the second input disk 5.

When the above-structured double-cavity toroidal-type continuously variable transmission is in operation, the rotation of the input shaft 2 is transmitted to the first input disk 4 through the pressing mechanism 45 constructed by a loading cam, so that the first input disk 4 and second input disk 5 are rotated in synchronization with each other. The rotational movements of the first input disk 4 and second input disk 5 are transmitted through the power rollers 36 to the first and second output disks 7, 8. And, the rotational movements of the first and second output disks 7, 8 are transmitted by the output gear 10 and are then taken out by the output shaft 17 through the transmission gear 18.

To change a rotation speed ratio between the input shaft 2 and output gear 10, based on the switching of a control valve (not shown), two pairs of drive pistons (not shown), which are disposed so as to correspond to the first and second cavities 21, 22, by a pair for each of them, may be shifted by the same distance in the mutually opposite directions in each of the cavities 21, 22.

With the shifting movements of these drive pistons, two pairs of, that is, a total of four trunnions 30 are shifted in the opposite directions; and, one power roller 36 is shifted downwardly, whereas the other power roller 36 is shifted upwardly. This changes the directions of forces of the tangential directions which respectively act on the contact portions of the peripheral surfaces of the respective power rollers 36 with the inner surfaces 4a, 5a of the first and second input disks 4, 5 and the inner surfaces 7a, 8a of the first and second output disks 7, 8. And, with the change of the directions of the forces, the trunnion 30 is swung in the opposite direction about pivot shafts which are pivotally supported on the upper yoke 13a and lower yoke 13b. This changes the contact positions of the peripheral surfaces of the respective power rollers 36 with the first and second input disks 4, 5 and first and second output disks 7, 8 to thereby change a rotation speed ratio between the input shaft 2 and output gear 10.

The above-structured double-cavity toroidal-type continuously variable transmission in the related art transmits the power by the power rollers 36 interposed between the first and second input disks 4, 5 and second and output disks 7, 8. Also, it is capable of transmitting large power and can provide high transmission efficiency.

However, in the double-cavity toroidal-type continuously variable transmission in the related art, the center of inclined rotation of the trunnions 30 must be made to coincide with the center of the radius of one of the first and second input disks 4, 5 or second and output disks 7, 8. Therefore, the disks and trunnion are respectively positioned with respect to the case 1 in such a manner that the disk radius axis can be made to coincide with the inclined rotation center axis of the trunnion 30.

That is, the disk radius center is adjusted by the gear housing 11 supporting the output gear 10 between the first and second output disks 7, 8. Also, in the case of the inclined rotation center axis of the trunnion 30, the support posts 14a, 14b supporting the upper yoke 13a and lower yoke 13b are positioned with respect to the case 1. Therefore, in the case 1, the position thereof for fixing the gear housing 11 as well as the position thereof for fixing the support posts 14a, 14b must be worked with high precision.

However, in the above-structured double-cavity toroidal-type continuously variable transmission in the related art, the direction to fix the gear housing 11 to the case 1 using the bolts 11f is the axial direction of the input shaft 2, whereas the direction to fix the support posts 14a, 14b to the case 1 and valve body 16 using the bolts 15 is the vertical direction which is perpendicular to the axial direction of the input shaft 2.

Therefore, when working the case 1, the case 1 is worked from the lower surface direction and side surface direction of the cylindrical-shaped case 1. Also, since the distance to the working surface is far, it is difficult to work such far working surface with high precision, which results in the increased working cost.

Further, the gear housing 11 supporting the output gear 10 is fixed to the inner surface of the case 1 using the bolts 11f. Also, the support posts 14a, 14b of the upper yoke 13a and lower yoke 13b for positioning the trunnions 30 are fixed to the case 1 and valve body 16 using the bolts 15.

Therefore, the bearing load of the ball bearing 12 supporting the output gear 10 is applied to the gear housing 11, so that the bearing load is transmitted to the case 1 to which the gear housing 11 is to be fixed. In the case of the double-cavity toroidal-type continuously variable transmission in the related art, in order to reduce the weight thereof, normally, the case 1 is often made of aluminum and, therefore, the portion of the case 1 to which the gear housing 11 is connected is locally increased in thickness to thereby enhance the strength of the case. However, this complicates the structure of the case 1 to which the gear housing 11 is to be fixed. Also, in case where the portion of the case 1 to which the gear housing 11 is to be fixed is increased in thickness, the axial-direction length of the whole of the toroidal-transmission mechanism portion is increased, which results in the increased size of the double-cavity toroidal-type continuously variable transmission in the related art.

Also, when assembling the respective parts to the case 1, for example, as shown in JP-A-11-108139, the respective parts are normally assembled into the interior portion of the case 1 sequentially. However, since all of the parts are assembled into the case 1, it is difficult to confirm the assembling state on the way until the assembly is completed finally. In case where there occurs poor assembly after completion of the assembly, the respective parts must be once taken out from the case 1 and must be then assembled again. Such re-assembly raises a fear that the traction surfaces of the disks and power rollers can be damaged, which disables the disks and power rollers to fulfill their performance sufficiently.

Also, when fixing the loading nut 2b to the back surface of the second input disk 4b through the coned disk spring 2a in the end portion of the input shaft 2, the compression amount of the coned disk spring 2a must be set properly. In case where the coned disk spring 2a is compressed excessively more than a design value, an excessive pressing stress occurs, which results in the lowered efficiency. Further, the stress of the coned disk spring 2a itself is also increased, which raises the cause of damage. On the other hand, in case where the coned disk spring 2a is expanded excessively more than the design value, the pressing force is shortened, which makes it impossible to transmit power between the disks and power rollers, resulting in the slippage of the loading nut 2b. Therefore, while the compression amount of the coned disk spring 2a must be controlled so as to provide a proper gap, it is difficult to carry out such control operation in the interior of the case 1 because the space (hole diameter) is small.

SUMMARY OF THE INVENTION

The present invention aims at eliminating the drawbacks found in the above-mentioned double-cavity toroidal-type continuously variable transmission in the related art. Accordingly, it is an object of the invention to provide a double-cavity toroidal-type continuously variable transmission which not only can position and fix its toroidal transmission mechanism portion to a case with high precision but also can facilitate the working of the respective parts including the case to thereby be able to reduce the manufacturing cost thereof.

Also, it is another object of the invention to provide a method for assembling a double-cavity toroidal-type continuously variable transmission, which is capable of assembling the toroidal transmission mechanism portion to the case with high efficiency.

In attaining the above objects, according to a first aspect of the invention, there is provided a double-cavity toroidal-type continuously variable transmission, comprising:

a case;

a pair of input and output disks supported in the interior portion of the case such as to be concentric with each other and be rotated independently of each other, the input and output disks each including an inner surface;

a trunnion disposed at a twisted position in a direction extending at right angles to the axial direction of the input and output disks, the trunnion including an even number of pivot shafts arranged concentric with each other or parallel to each other;

a plurality of yokes respectively for supporting the pivot shafts of the trunnion in a swingable manner;

a displacement shaft including a support shaft portion and a pivot shaft portion arranged parallel and eccentric to each other;

a plurality of power rollers, while being supported in the trunnion so as to be rotatable about the displacement shaft, rollably contactable with the inner surfaces of the input and output disks;

an output gear interposed between a pair of output disks for taking out the rotational movements of the output disks;

a gear housing for supporting the output gear;

a support post for supporting the yoke; and, a fixing member for fixing the gear housing and the support post to the case.

In the double-cavity toroidal-type continuously variable transmission according to the first aspect of the invention, the support posts and the fixing member are formed as an integral body.

Further, in the double-cavity toroidal-type continuously variable transmission according to the first aspect of the invention, the gear housing and the fixing member are formed as an integral body.

Moreover, in the double-cavity toroidal-type continuously variable transmission according to the first aspect of the invention, the yoke comprises an upper yoke and a lower yoke, wherein the support post comprises a first support post for supporting the upper yoke and a second support post for supporting the lower yoke; and, wherein the fixing member comprises a first fixing member for fixing the first support post and the gear housing to the case and a second fixing member for fixing the second support posts and the gear housing to the case.

In addition to the above structure, the second fixing member and the gear housing may be fixed to each other by a fixing plate.

In addition, in the double-cavity toroidal-type continuously variable transmission according to the first aspect of the invention, wherein the yoke comprises an upper yoke and a lower yoke, wherein the support post comprises a first support post for supporting the upper yoke and a second support post for supporting the lower yoke; and, wherein the first and second support posts are connected together as an integral body by a connecting member.

According to a second aspect of the invention, there is provided a method for assembling a double-cavity toroidal-type continuously variable transmission, the transmission comprising:

a case;

a pair of input and output disks respectively supported in the interior portion of the case such as to be concentric with each other and be rotated independently of each other, the input disk and output disk each including an inner surface;

a trunnion existing at a twisted position in a direction extending at right angles to the axial direction of the input and output disks, the trunnion including an even number of pivot shafts concentric with each other or parallel to each other;

a plurality of yokes respectively for supporting the pivot shafts of the trunnion in a swingable manner;

a displacement shaft including a support shaft portion and a pivot shaft portion arranged parallel to and eccentric to each other;

a plurality of power rollers, while being supported in the trunnion so as to be rotatable about the displacement shaft, rollably contactable with the inner surfaces of the input and output disks;

an output gear interposed between a pair of output disks for taking out the rotational movements of the output disks;

a gear housing for supporting the output gear;

a support post for supporting the yoke; and, a fixing member for fixing the gear housing and the support post to the case, the assembling method comprising the step of:

fixing the gear housing including the output gear and the support posts for supporting the yoke to the fixing member; and, assembling the gear housing and the support posts together with the fixing member into the case.

Further, according to a third aspect of the invention, there is provided a method for assembling a double-cavity toroidal-type continuously variable transmission, the transmission comprising:

a case; a drive shaft; and, a toroidal transmission mechanism portion;

the toroidal transmission mechanism portion, comprising:

an input shaft;

a pair of input and output disks supported in the interior portion of the case such as to be concentric with each other and be rotated independently of each other, the input disk and output disk each including an inner surface;

a trunnion existing at a twisted position in a direction extending at right angles to the axial direction of the input and output disks, the trunnion including an even number of pivot shafts concentric with each other or parallel to each other;

a plurality of yokes respectively for supporting the pivot shafts of the trunnion in a swingable manner;

a displacement shaft including a support shaft portion and a pivot shaft portion arranged parallel to and eccentric to each other;

a plurality of power rollers, while being supported in the trunnion so as to be rotatable about the displacement shaft, rollably contactable with the inner surfaces of the input and output disks;

an output gear interposed between a pair of output disks for taking out the rotational movements of the output disks;

a gear housing for supporting the output gear;

a support post for supporting the yoke; and, a fixing member for fixing the gear housing and the support post to the case, the assembling method, comprising the steps of:

fixing the gear housing including the output gear and the support post for supporting the yoke to the fixing member and, after then, assembling the gear housing and the support post supporting the yoke together with the fixing member into the case;

installing the input shaft into the output gear and, after then, installing the toroidal transmission mechanism portion including a pair of output disks, the trunnion with the power rollers mounted thereon and a pair of input disks to the input shaft from the two end sides of the input shaft; and, installing the toroidal transmission mechanism portion into the case, and fixing the toroidal transmission mechanism portion to the case while making the disk rotation center coincide with the rotation center of the drive shaft by measuring a distance between the outer surface of the fixing member and the disk rotation center of the toroidal transmission mechanism portion.

According to the invention, in case where the support posts for supporting their respective yokes and the fixing member for fixing the support posts to the case are connected together or are formed as an integral body, the connecting portions of the respective parts with the positioning members can be reduced in number, the deformation of the parts can be reduced even when a load is applied thereto. This can enhance the efficiency of the assembling operation and also can simplify the structure of the transmission.

Also, the gear housing and the support posts supporting the yokes are fixed to the case through the fixing member having rigidity. Due to this, the bearing load supporting the output gear is received by the gear housing and thus the load is received by a member for fixing the gear housing, so that the load is not received by the case. As a result of this, there is eliminated the need that the portion of the case 1 for connecting the gear housing thereto is locally increased in thickness to thereby enhance the strength of the case 1. This can simplify the shape of the case 1 and also can reduce the thickness of the case 1.

Further, since all support posts disposed within the same cavity are connected together as an integral body, the rigidity of the case 1 can be enhanced further.

And, according to the assembling method of the invention, after the toroidal transmission mechanism is assembled, it is assembled into the case. This makes it possible to confirm the operation of the toroidal transmission mechanism before it is assembled into the case.

BRIEF DESCRIPTION OF THE DRAWINGS

FIGS. 2A and 2B show a double-cavity toroidal-type continuously variable transmission according to the first embodiment; specifically.

DETAILED DESCRIPTION OF THE PREFERRED EMBODIMENTS

Now, description will be given below of the preferred embodiments of a double-cavity toroidal type continuously variable transmission according to the invention with reference to the accompanying drawings. By the way, the same parts as those of the conventional double-cavity toroidal type continuously variable transmission are given the same designations, and thus the description thereof is omitted.

FIGS. 1A to 2B show a first embodiment of a double-cavity toroidal type continuously variable transmission according to the invention. In the first embodiment, an output gear 10, which is inserted into an input shaft 2 and also to which the rotational movements of first and second output disks 7, 8 are transmitted, and a transmission gear 18 to be meshingly engaged with the output gear 10 are supported by a gear housing 51. The gear housing 51 includes a pair of left and right support walls 51a, 51b and, between the pair of left and right support walls 51a and 51b, there is formed a ring-shaped space portion 51c which is used to envelope the teeth portions of the output gear 10 and transmission gear 18.

The outer peripheral edge portions of the upper portions of the support walls 51a and 51b are engaged with each other by a stepped engaging portion 51d. Further, a bolt hole 51e which extends in the vertical direction (a direction at right angles to the axial direction of the input shaft 2) is formed in the stepped engaging portion 51d. A bolt 54 which is inserted into a penetration hole 53 formed in a first fixing member 52 is threadedly engaged with the bolt hole 51e, whereby the gear housing 51 is fixed to the first fixing member 52.

The first fixing member 52 is a metal plate having rigidity, while the two end portions of the first fixing member 52 are extended up to first and second cavities 21, 22. First support posts 14a supporting their respective upper yokes 13a are connected to the two end portions of the first fixing member 52 by bolts 70 (See FIG. 1B). Further, a plurality of penetration holes 55 which extend in the vertical direction (the direction at right angles to the axial direction of the input shaft 2) are formed on the two end portions of the first fixing member 52, and, bolts 56 are inserted into these penetration holes 55, whereby the first fixing member 52 is fixed to the inner surface of the case 1.

Figure 1A:
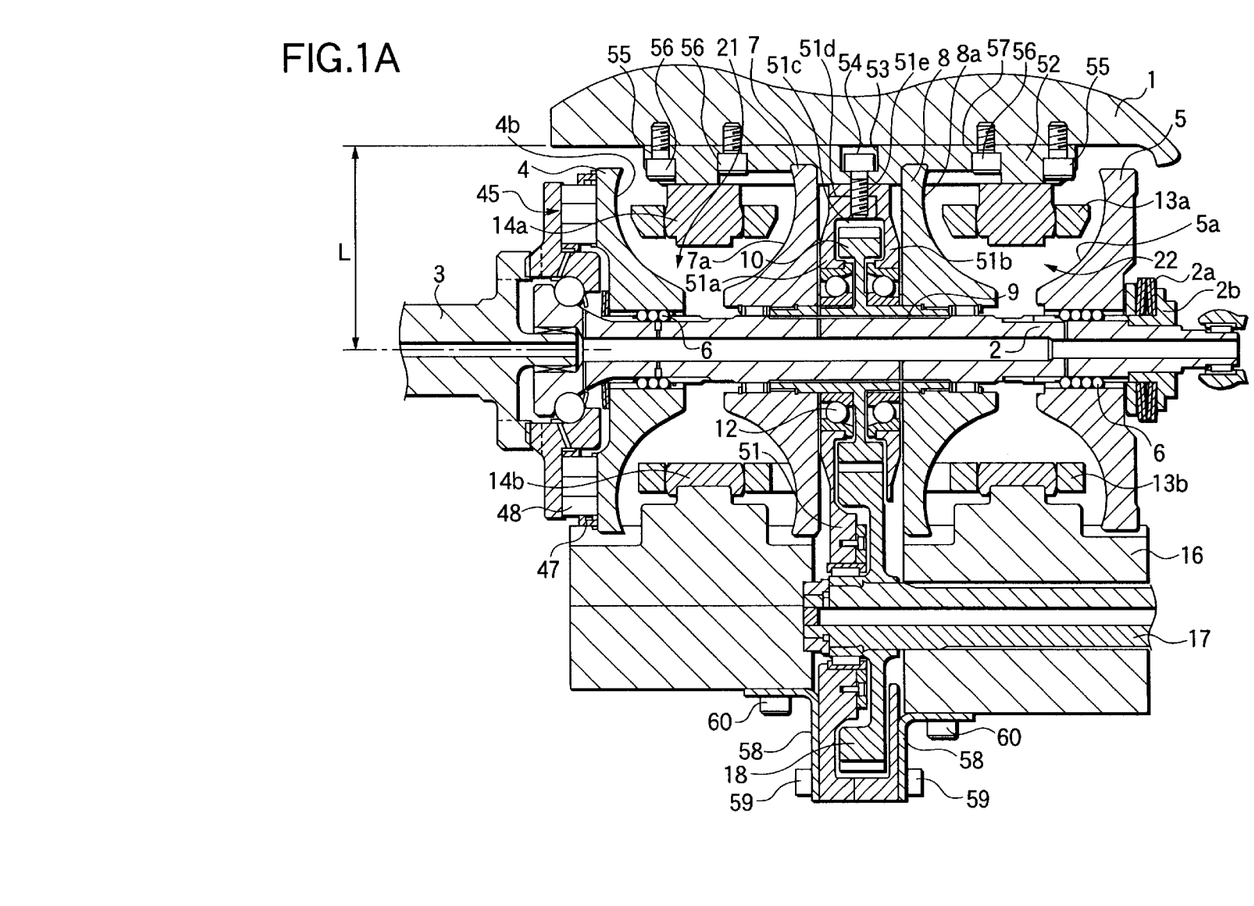
FIG. 1A is a longitudinal side view of a double-cavity toroidal-type continuously variable transmission according to a first embodiment of the invention.
Figure 1B:
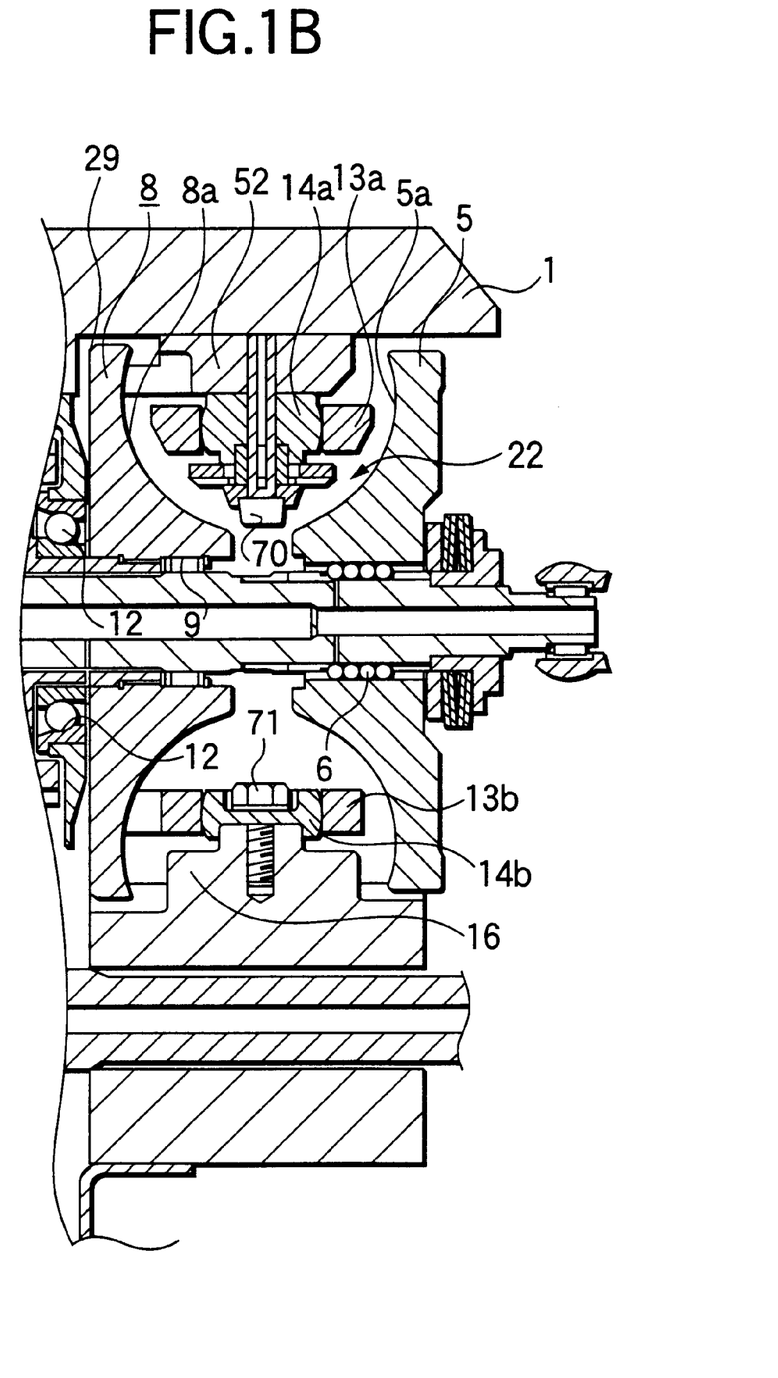
FIG. 1B shows a cavity 22 side of the double-cavity toroidal-type continuously variable transmission according to the first embodiment of the invention, taken along a section different from the cross-section of FIG. 1A.

Therefore, the gear housing 51 as well as the first support posts 14a supporting their respective upper yokes 13a are fixed to the inner surface of the case 1 through the first fixing member 52. Also, a spacer 57 which is used to adjust a distance L between the outer surface of the first fixing member 52 and the axis of the input shaft 2 is interposed between the first fixing member 52 and case 1.

Also, second support posts 14b supporting their respective lower yokes 13b are connected to a valve body 16 serving as a second fixing member by bolts 71 (See FIG. 1B). Further, L-bent fixing plates 58 are fixed to the two right and left side surfaces of the lower portion of the gear housing 51 by their respective bolts 59, while these fixing plates 58 are also fixed to the lower surface of the valve body 16 by bolts 60 respectively. And, the valve body 16 is fixed to the inner surface of the case 1.

As described above, according to the first embodiment, the bearing load for supporting the output gear 10 is received by the gear housing 51 and thus the load is received by the first fixing member 52 fixed to the gear housing 51 as well as by the valve body 16 serving as the second fixing member, which can prevent the load from being applied to the case 1.

This eliminates the need to increase locally the thickness of the portion of the case 1 for connection of the gear housing 51 to thereby enhance the strength of the case 1, which can simplify the shape of the case 1, can reduce the thickness of the case 1 and can reduce the weight of the whole of the toroidal transmission mechanism portion as well as the axial-direction length thereof.

Figure 2A:
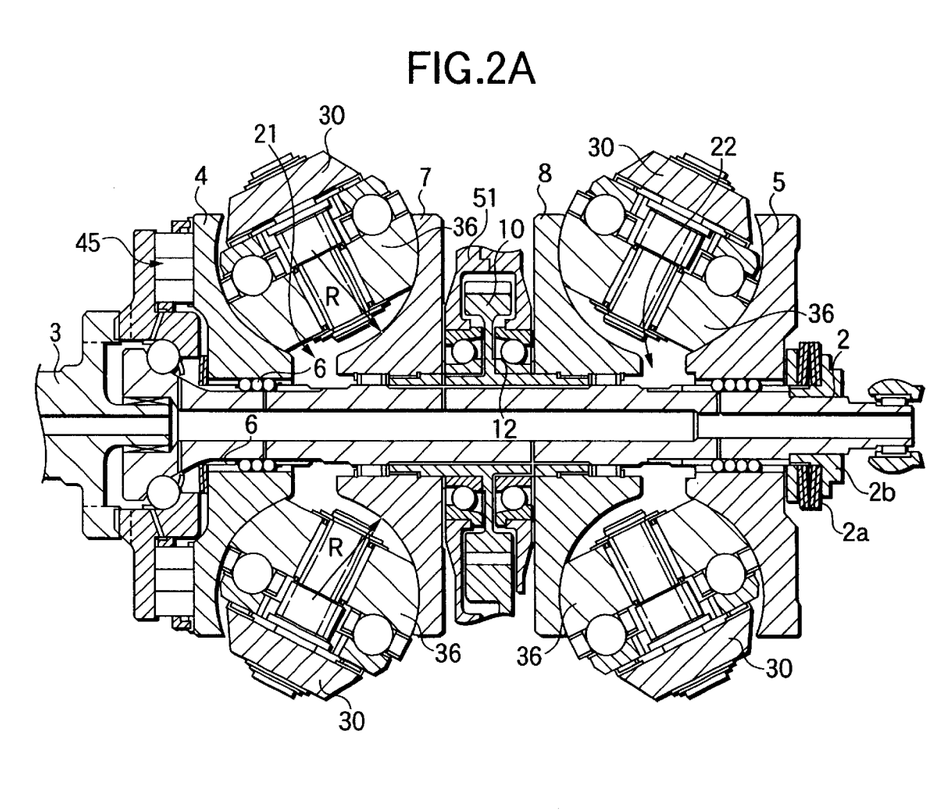
FIG. 2A is a longitudinal section view thereof.
Figure 2B:
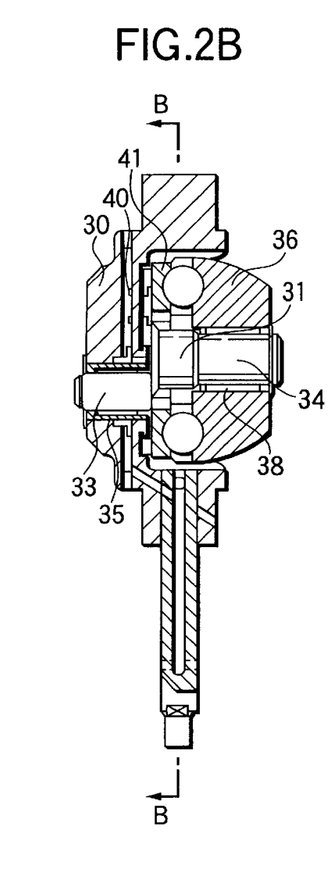
FIG. 2B is a longitudinal section view of a trunnion.

Also, in a toroidal-type continuously variable transmission, as shown in FIG. 2, the inclined rotation center B—B of the trunnion 30 must be made to coincide with the center of one disk radius R of the first and second input disks 4, 5 or the first and second output disks 7, 8. However, in the present embodiment, since the first and second support posts 14a, 14b are fixed to the first fixing member 52 and valve body 16, even in case where a load is applied to the first and second support posts 14a, 14b, they are prevented against deformation, the disk radius R and the inclined rotation center B—B of the trunnion 30 can be prevented from shifting from each other, the falling-down of the output gear 10 can be restricted, and, even when large torque is transmitted, lowered torque transmission efficiency can be prevented.

By the way, in the first embodiment, the first support posts 14a supporting the upper yokes 13a are fixed to the first fixing member 52 using the bolts, while the second support posts 14b supporting the lower yokes 13b are fixed to the valve body 16 using the bolts. However, this is not limitative but they may also be formed as an integral body. Also, as the output means for outputting the power to the output shaft, there can be used not only a gear transmission mechanism such as an output gear but also a belt transmission mechanism and a chain transmission mechanism. Further, the first fixing member 52 and gear housing 51 may be formed as an integral body; and, the valve body 16 and gear housing 51 may be formed as an integral body.

Figure 3:
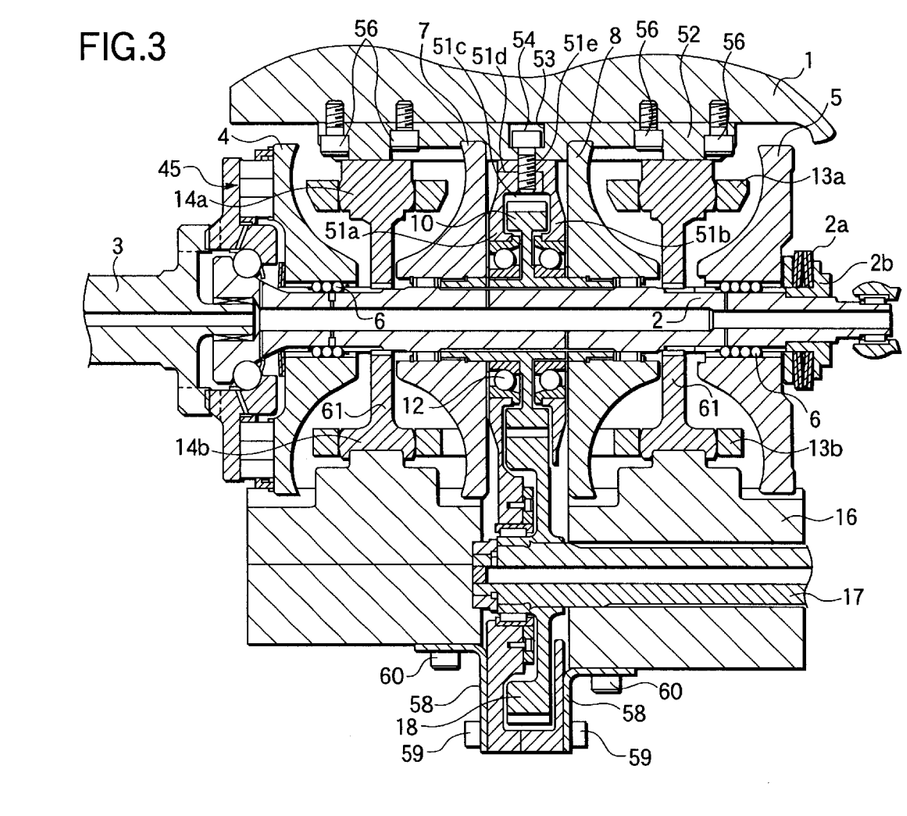
FIG. 3 is a longitudinal side view of a double-cavity toroidal-type continuously variable transmission according to a second embodiment of the invention.

Now, FIG. 3 shows a second embodiment of a double-cavity toroidal type continuously variable transmission according to the invention. In the present embodiment, in addition to the structure of the first embodiment, the first and second support posts 14a, 14b respectively disposed within the first and second cavities 21, 22 are connected together into an integral body by connecting members 61. According to the present embodiment, since the upper and lower support posts 14a, 14b are connected together as an integral body, the rigidity of the structure can be enhance further.

Figure 4:
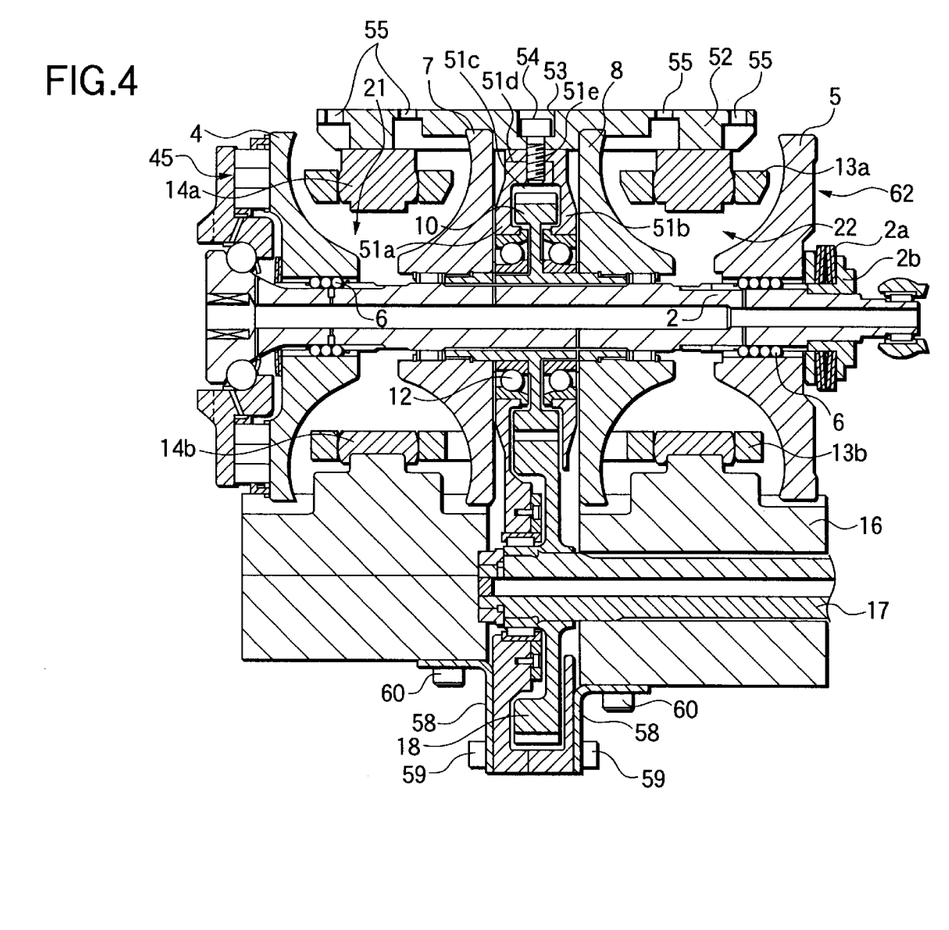
FIG. 4 is a longitudinal side view of a toroidal transmission mechanism portion according to a third embodiment of the invention.

Now, FIG. 4 shows a third embodiment of a double-cavity toroidal type continuously variable transmission according to the invention. In the third embodiment, description will be given below of a method for assembling a toroidal transmission mechanism portion to a case in the manufacturing process of a double-cavity toroidal-type continuously variable transmission. Specifically, FIG. 4 shows a state before a toroidal transmission mechanism portion 62 is assembled to a case 1. Firstly, description will be given below of the procedure for assembling the toroidal transmission mechanism portion 62.

(1) The support walls 51a, 51b forming the gear housing 51 are positioned on the two side portions of the output gear 10, and the support walls 51a, 51b are engaged with each other at the stepped engaging portion 51c, so that the bolt holes 51d of the support walls 51a, 51b are disposed opposed to each other. And, the bolt 54 is inserted through the bolt penetration hole 53 from the upper surface side of the first fixing member 52 and is thus threadedly engaged into the bolt hole 51d, thereby connecting together the gear housing 51 and first fixing member 52.

(2) The upper yoke 13a is assembled into the first fixing member 52.

(3) The input shaft 2 is inserted into the output gear 10. And, the first and second output disks 7 and 8 are fitted with the input shaft 2 from the two end sides thereof, and are also fitted with the output gear 10.

(4) Trunnions 30 (trunnion assembly) with the power rollers 36 mounted thereon are assembled.

(5) The first and second input disks 4 and 5 are assembled to the input shaft 2 respectively from the two end sides thereof.

(6) The lower yokes 13b are assembled.

(7) The valve body 16 with the support posts 14b fixed thereto is fitted with the pivot shafts of the trunnions 30.

(8) The fixing plates 58 are fixed to the two right and left side surfaces of the lower portion of the gear housing 51 by the bolts 59 and the fixing plates 58 are also fixed to the lower surface of the valve body 16 by the bolts 60.

(9) The distance L between the outer surface of the first fixing member 52 and the disk rotation center of the toroidal transmission mechanism portion 62 is measured, the thickness of the spacer 57 is set, and the spacer 57 is interposed between the first fixing member 52 and the inner surface of the case 1. And, the bolts 56 are inserted into the penetration holes 55 from the lower side of the first fixing member 52 to thereby fix the first fixing member 52 to the inner surface of the case 1.

As described above, the toroidal transmission mechanism portion 62, which has been assembled according to the steps (1) to (8), is assembled into the case 1. What is important here is to make the disk rotation center of the toroidal transmission mechanism portion 62 coincide with the rotation center of the drive shaft 3. Therefore, in the step (9), the distance L between the outer surface of the first fixing member 52 and the disk rotation center of the toroidal transmission mechanism portion 62 is measured, thereby making the disk rotation center of the toroidal transmission mechanism portion 62 coincide with the rotation center of the drive shaft 3.

Also, when assembling the first and second input disks 4 and 5 from the two end sides of the input shaft 2 in the step (5), after the coned disk spring 2a is fitted with the end portion of the input shaft 2, the loading nut 2b must be tightened to thereby set the compression amount of the coned disk spring 2a for a proper value. According to this structure, since the tightening amount of the loading nut 2b can be adjusted outside the case 1, there can be provided an excellent operation efficiency.

As has been described heretofore, according to the invention, since the support posts supporting their respective yokes are connected together by the fixing member for fixing these support posts to the case, or, are formed as an integral body, the connecting portions of the respective parts with the positioning members can be reduced, the deformation of the parts can be reduced even in case where a load is applied thereto, the operation efficiency can be enhanced, and the structure can be simplified. This makes it possible to facilitate the working of the case as well as reduce the size and weight of the whole apparatus.

Also, even in case where the gear housing receives the bearing load for supporting the output gear, and the member for fixing the gear housing receives the bearing load, which can prevent the bearing load from being applied to the case. This eliminates the need to increase locally the thickness of the portion of the case for connection of the gear housing to thereby enhance the strength of the case 1, which can simplify the shape of the case as well as reduce the thickness thereof.

Further, since all of the support posts disposed within the same cavity are connected together as an integral body, the rigidity of the structure can be enhanced further.

According to the assembling method of the invention, after the toroidal transmission mechanism portion is assembled, it is assembled into the case. Therefore, before assembling the toroidal transmission mechanism portion into the case, the operation of the toroidal transmission mechanism portion can be confirmed.

What is claimed is:

1. A double-cavity toroidal-type continuously variable transmission, comprising:
   a case;
   a pair of input and output disks supported in the interior portion of said case such as to be concentric with each other and be rotated independently of each other, said input and output disks each including an inner surface;
   a trunnion disposed at a twisted position in a direction extending at right angles to the axial direction of said input and output disks, said trunnion including an even number of pivot shafts arranged concentric with each other or parallel to each other;
   a plurality of yokes respectively for supporting said pivot shafts of said trunnion in a swingable manner;
   a displacement shaft including a support shaft portion and a pivot shaft portion arranged parallel and eccentric to each other;
   a plurality of power rollers, while being supported in said trunnion so as to be rotatable about said displacement shaft, rollably contactable with said inner surfaces of said input and output disks;
   an output gear interposed between a pair of output disks for taking out the rotational movements of said output disks;
   a gear housing for supporting said output gear;
   a support post for supporting said yoke; and, a fixing member for fixing said gear housing and said support post to said case.

2. A double-cavity toroidal-type continuously variable transmission as set forth in claim 1, wherein said support posts and said fixing member are formed as an integral body.

3. A double-cavity toroidal-type continuously variable transmission as set forth in claim 1, wherein said gear housing and said fixing member are formed as an integral body.

4. A double-cavity toroidal-type continuously variable transmission as set forth in claim 1, wherein said yoke comprises an upper yoke and a lower yoke,
   wherein said support post comprises a first support post for supporting said upper yoke and a second support post for supporting said lower yoke; and,
   wherein said fixing member comprises a first fixing member for fixing said first support post and said gear housing to said case and a second fixing member for fixing said second support posts and said gear housing to said case.

5. A double-cavity toroidal-type continuously variable transmission as set forth in claim 4, wherein said second fixing member and said gear housing are fixed to each other by a fixing plate.

6. A double-cavity toroidal-type continuously variable transmission as set forth in claim 1, wherein said yoke comprises an upper yoke and a lower yoke,
   wherein said support post comprises a first support post for supporting said upper yoke and a second support post for supporting said lower yoke; and,
   wherein said first and second support posts are connected together as an integral body by a connecting member.

7. A method for assembling a double-cavity toroidal-type continuously variable transmission, said transmission comprising:
   a case;
   a pair of input and output disks respectively supported in the interior portion of said case such as to be concentric with each other and be rotated independently of each other, said input disk and output disk each including an inner surface;

a trunnion existing at a twisted position in a direction extending at right angles to the axial direction of said input and output disks, said trunnion including an even number of pivot shafts concentric with each other or parallel to each other;

a plurality of yokes respectively for supporting said pivot shafts of said trunnion in a swingable manner;

a displacement shaft including a support shaft portion and a pivot shaft portion arranged parallel to and eccentric to each other;

a plurality of power rollers, while being supported in said trunnion so as to be rotatable about said displacement shaft, rollably contactable with said inner surfaces of said input and output disks;

an output gear interposed between a pair of output disks for taking out the rotational movements of said output disks;

a gear housing for supporting said output gear;

a support post for supporting said yoke; and, a fixing member for fixing said gear housing and said support post to said case, said assembling method comprising the steps of:
fixing said gear housing including said output gear and said support posts for supporting said yoke to said fixing member; and,
assembling said gear housing and said support posts together with said fixing member into said case.

8. A method for assembling a double-cavity toroidal-type continuously variable transmission, said transmission comprising:

a case; a drive shaft; and, a toroidal transmission mechanism portion;

said toroidal transmission mechanism portion, comprising:
an input shaft;
a pair of input and output disks supported in the interior portion of said case such as to be concentric with each other and be rotated independently of each other, said input disk and output disk each including an inner surface;

a trunnion existing at a twisted position in a direction extending at right angles to the axial direction of said input and output disks, said trunnion including an even number of pivot shafts concentric with each other or parallel to each other;

a plurality of yokes respectively for supporting said pivot shafts of said trunnion in a swingable manner;

a displacement shaft including a support shaft portion and a pivot shaft portion arranged parallel to and eccentric to each other;

a plurality of power rollers, while being supported in said trunnion so as to be rotatable about said displacement shaft, rollably contactable with said inner surfaces of said input and output disks;

an output gear interposed between a pair of output disks for taking out the rotational movements of said output disks;

a gear housing for supporting said output gear;

a support post for supporting said yoke; and, a fixing member for fixing said gear housing and said support post to said case, said assembling method, comprising the steps of:
fixing said gear housing including said output gear and said support post for supporting said yoke to said fixing member;
installing said input shaft into said output gear and, after then, installing said toroidal transmission mechanism portion including a pair of output disks, said trunnion with said power rollers mounted thereon and a pair of input disks to said input shaft from the two end sides of said input shaft; and,
installing said toroidal transmission mechanism portion into said case, and fixing said toroidal transmission mechanism portion to said case while making said disk rotation center coincide with the rotation center of said drive shaft by measuring a distance between the outer surface of said fixing member and the disk rotation center of said toroidal transmission mechanism portion.

* * * * *